United States Patent
Cai et al.

(10) Patent No.: US 11,019,699 B2
(45) Date of Patent: May 25, 2021

(54) POWER AND COMMUNICATION ADAPTER FOR LIGHTING SYSTEM FOR INDOOR GROW APPLICATION

(71) Applicant: HGCI, Inc., Las Vegas, NV (US)

(72) Inventors: Dengke Cai, Camas, WA (US); Martin Ray Mason, Jr., Vancouver, WA (US)

(73) Assignee: HGCI, INC., Las Vegas, NV (US)

( * ) Notice: Subject to any disclaimer, the term of this patent is extended or adjusted under 35 U.S.C. 154(b) by 0 days.

(21) Appl. No.: 16/870,072

(22) Filed: May 8, 2020

(65) Prior Publication Data

US 2020/0359482 A1 Nov. 12, 2020

Related U.S. Application Data

(60) Provisional application No. 62/844,926, filed on May 8, 2019.

(51) Int. Cl.
| | |
|---|---|
| *H05B 45/37* | (2020.01) |
| *H05B 45/385* | (2020.01) |
| *A01G 7/04* | (2006.01) |
| *H05B 47/29* | (2020.01) |
| *F21V 25/04* | (2006.01) |
| *H05B 47/185* | (2020.01) |
| *F21Y 115/10* | (2016.01) |

(52) U.S. Cl.
CPC ........... *H05B 45/385* (2020.01); *A01G 7/045* (2013.01); *F21V 25/04* (2013.01); *H05B 47/185* (2020.01); *H05B 47/29* (2020.01); *F21Y 2115/10* (2016.08)

(58) Field of Classification Search
CPC ........ H05B 33/08; H05B 37/02; H05B 45/10; H05B 45/30; H05B 45/37; H05B 45/385; H05B 47/10; H05B 47/185; H05B 47/29
See application file for complete search history.

(56) References Cited

U.S. PATENT DOCUMENTS 9,521,717 B2 * 12/2016 Kangyo ................. H05B 45/10
10,085,317 B2 * 9/2018 Foster ................. H04L 12/4625
(Continued)

OTHER PUBLICATIONS

Young, Lee; International Search Report and Written Opinion of the International Searching Authority issued in International Application No. PCT/US2020/032034; dated Aug. 6, 2020; 10 pages.

*Primary Examiner* — Thai Pham
(74) *Attorney, Agent, or Firm* — Ulmer & Berne LLP (57) ABSTRACT

An adapter for a greenhouse and indoor grow automated controller is provided. The adapter includes a power input, a power output, a control input, a main controller, and a first control output. The power output is electrically coupled with the power input. The control input is configured to receive an original control signal from an automated greenhouse controller. The main controller is coupled with the power input to facilitate powering of the main controller from the power source. The main controller is in signal communication with the control input and is configured to convert the original control signal from the automated greenhouse controller into an LED-compatible driver signal. The first control output is in signal communication with the main controller. The original control signal conforms to a first signal protocol and the LED-compatible driver signal conforms to a second signal protocol that is different from the first signal protocol.

22 Claims, 5 Drawing Sheets (56) References Cited

U.S. PATENT DOCUMENTS

2010/0102734 A1* 4/2010 Quick .................... H05B 47/18
                                                    315/185 R
2017/0034895 A1* 2/2017 Vogel ..................... H05B 45/50
2017/0311396 A1* 10/2017 Sadwick ................ F21V 25/04

* cited by examiner

POWER AND COMMUNICATION ADAPTER FOR LIGHTING SYSTEM FOR INDOOR GROW APPLICATION

REFERENCE TO RELATED APPLICATION

This application claims priority of U.S. provisional patent application Ser. No. 62/844,926, entitled Power and Communication Adapter for Lighting System for Indoor Grow Application, filed May 8, 2019, and hereby incorporates this provisional patent application by reference herein in its entirety.

TECHNICAL FIELD

The apparatus described below generally relates to powering and controlling a lighting system. In particular, an adapter is provided that receives an original control signal from a greenhouse and indoor grow automation system, translates the original control signal into an LED-compatible control signal, and communicates the LED-compatible control signal to facilitate control of a Light Emitting Diode (LED) light fixture.

BACKGROUND

Conventional greenhouse and indoor grow automation systems include an automated greenhouse controller that transmits a control signal to HID lights and/or xenon lights to control dimming, scheduling, as well as other parameters, of the HID lights and/or xenon lights. The control signal transmitted from the automated greenhouse controller to control of these types of lights is typically not backwards compatible with LED lights. As such, upgrading a greenhouse or other indoor grow facility with LED lights, typically requires the entire greenhouse automation system to be completely replaced with an LED-compatible system, which can be time consuming and expensive.

BRIEF DESCRIPTION OF THE DRAWINGS

Various embodiments will become better understood with regard to the following description, appended claims and accompanying drawings wherein:

DETAILED DESCRIPTION

Figure 1:
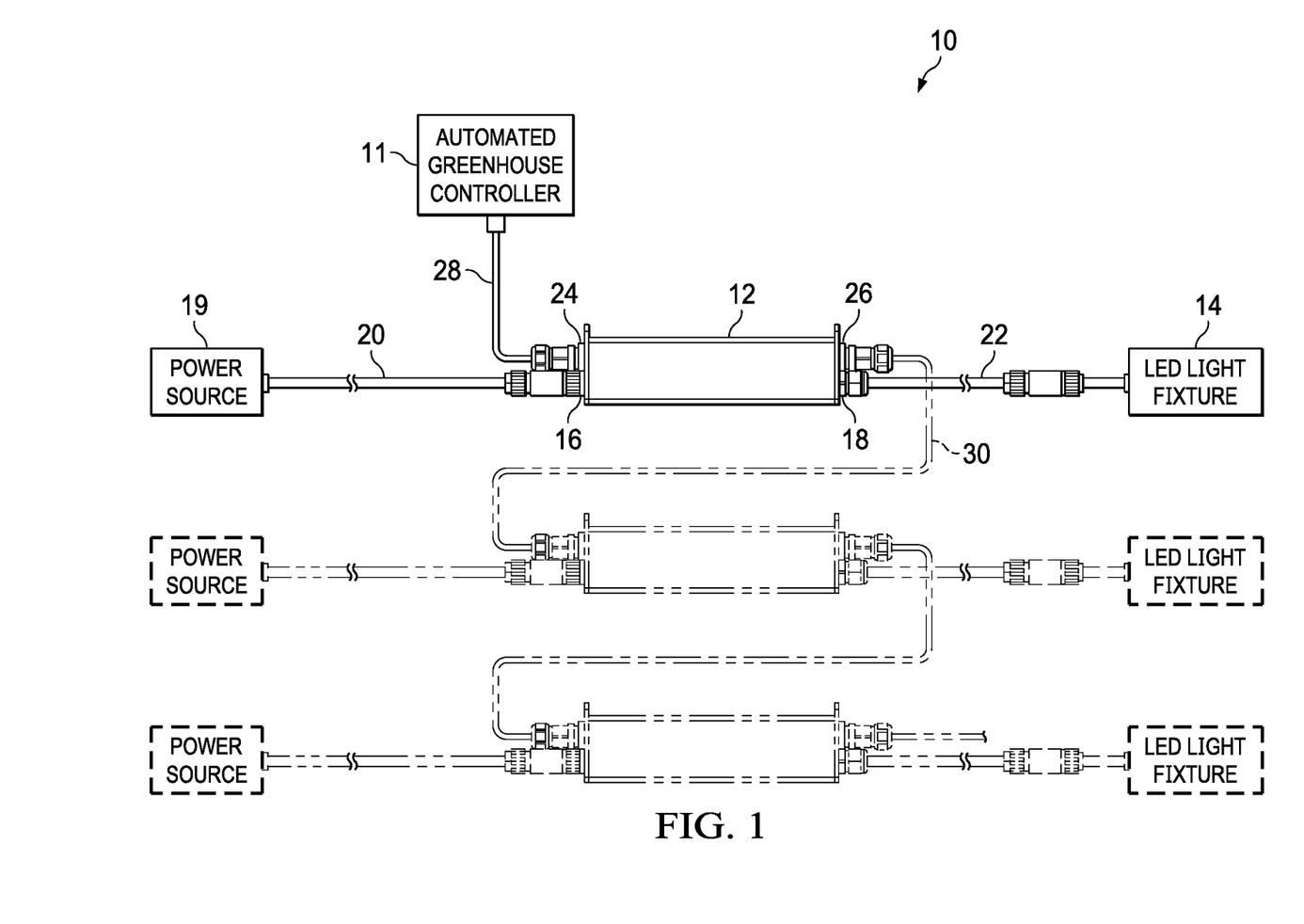
FIG. 1 is a schematic view depicting a lighting system having an adapter and an LED light fixture, in accordance with one embodiment.

Embodiments are hereinafter described in detail in connection with the views and examples of FIGS. 1-5, wherein like numbers indicate the same or corresponding elements throughout the views. A lighting system 10 for an indoor grow facility (e.g., a greenhouse) is generally depicted in FIG. 1 and is shown to include an automated greenhouse controller 11, an adapter 12 coupled with the automated greenhouse controller 11, and an LED light fixture 14 coupled with the adapter 12. The automated greenhouse controller 11 is configured to transmit an original control signal that is compatible with, and configured to control, HID lights, xenon lights, or any of a variety of non-LED type lighting arrangements. As will be described in further detail below, the adapter 12 can be configured to receive the original control signal from the automated greenhouse controller 11, translate the original control signal into an LED-compatible control signal and communicate the LED-compatible control signal to the LED light fixture 14 to facilitate control of the dimming, scheduling, or other control parameters of the LED light fixture 14.

Referring now to FIG. 1, the adapter 12 can be in signal communication (e.g., communicatively coupled) with other adapters (shown in dashed lines) that are similar to the adapter 12. As such, the original control signal can be communicated from the adapter 12 to the other adapters, and translated into an LED-compatible signal by the other LED light fixtures (shown in dashed lines) to control each of the LED light fixtures substantially simultaneously. One or more of the adapters (e.g., 12) can accordingly be used in a conventional lighting system when retrofitting the lighting system with LED light fixtures (e.g., 14), without requiring replacement of the automated greenhouse controller 11, which can be costly and time consuming.

Figure 2:
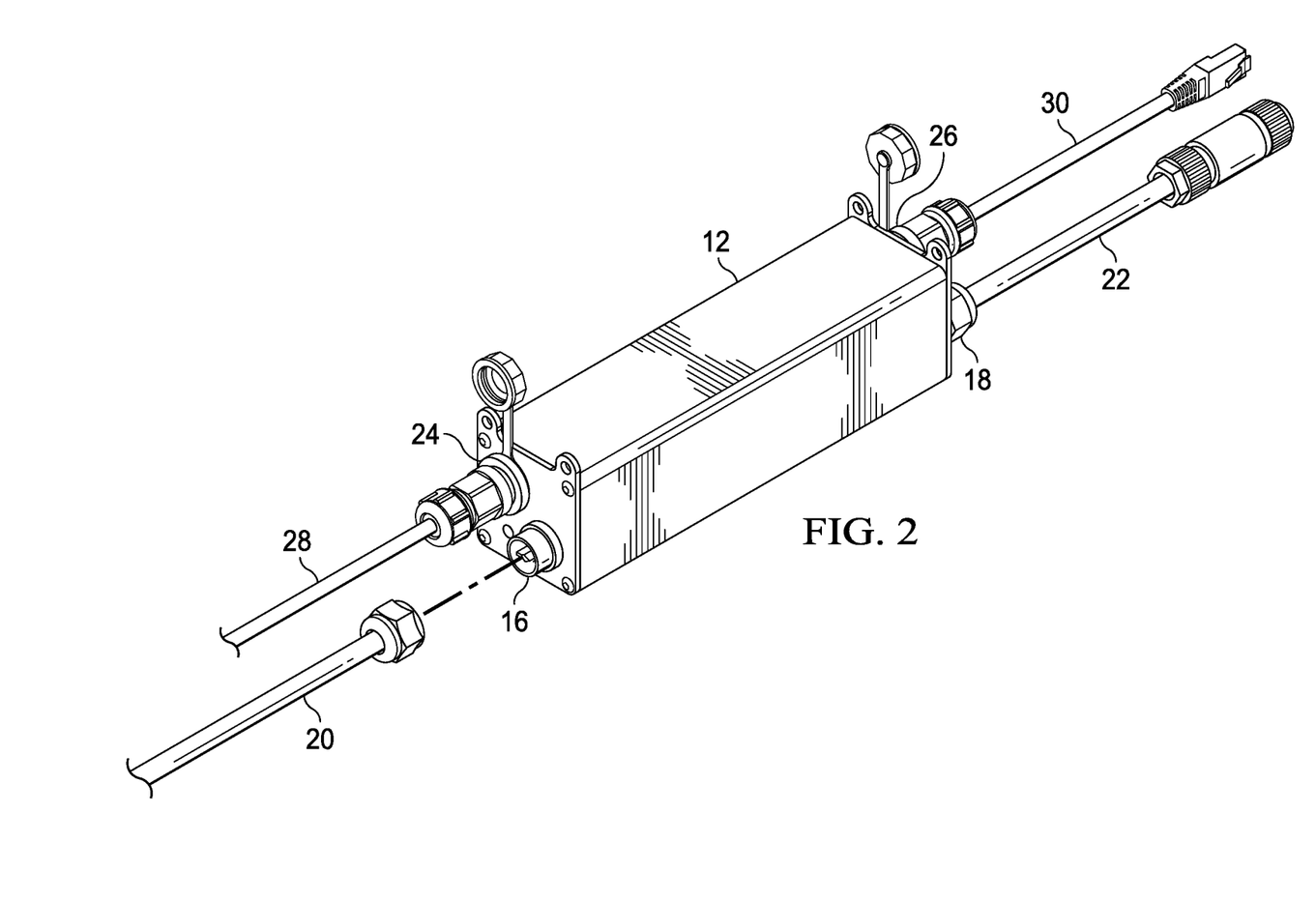
FIG. 2 is a front isometric view of the adapter of FIG. 1, in accordance with one embodiment.
Figure 3:
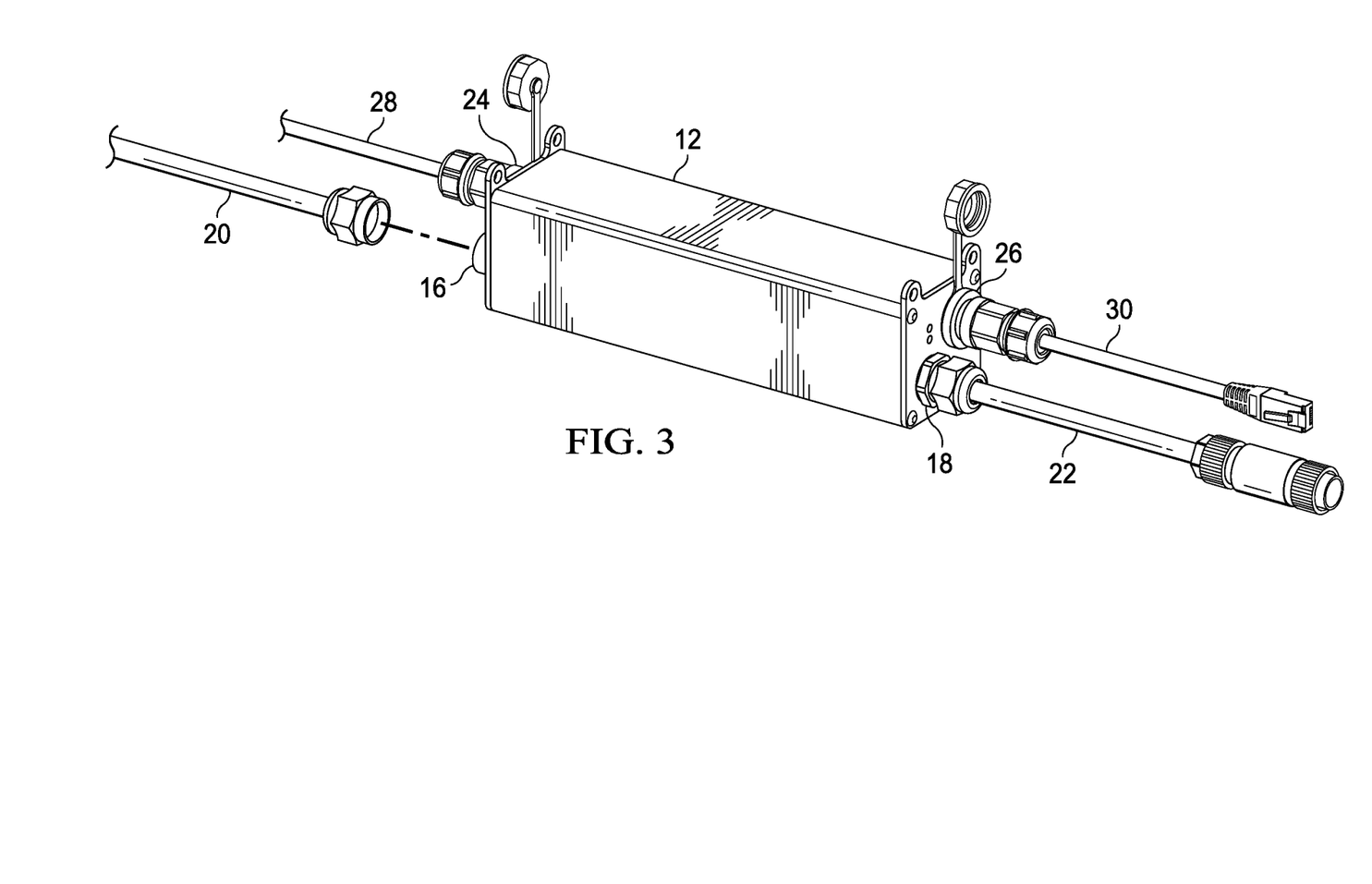
FIG. 3 is a rear isometric view of the adapter of FIG. 2.

Referring now to FIGS. 2 and 3, the adapter 12 can be understood to be a representative example of each of the other adapters illustrated in FIG. 1. The adapter 12 can include an input power interface 16 (FIG. 2) and an output power/control interface 18 (FIG. 3). A power source 19 (FIG. 1), such as an external A/C power source (e.g., a wall receptacle), can be electrically coupled with the input power interface 16 by a power cable 20 that is attached to the input power interface 16 such that external power can be provided to the adapter 12. The output power/control interface 18 can be electrically coupled with the LED light fixture 14 by a power/communication cable 22 that facilitates delivery of the power from the power source 19 (FIG. 1) to power the LED light fixture 14. In one embodiment, the adapter 12 and the LED light fixture 14 can be configured to operate at an input power of between about 85 VAC and about 347 VAC (e.g., a 750 Watt load capacity).

The adapter 12 can also include an input control interface 24 (FIG. 2) and an output control interface 26 (FIG. 3). The automated greenhouse controller 11 can be communicatively coupled with the input control interface 24 by a communication cable 28 that is attached to the input control interface 24 to facilitate communication of the original control signal from the automated greenhouse controller 11 to the adapter 12. The output control interface 26 can be communicatively coupled (e.g., in signal communication) with another adapter (as illustrated in dashed lines in FIG. 1), or another communication device, by a communication cable 30 such that the original control signal can be communicated to one or more downstream adapter(s)/communication device(s). In one embodiment, each of the input power interface 16, the output power/control interface 18, the input control interface 24, and the output control interface 26 can comprise Wieland-type connectors. It is to be appreciated, however, that any of a variety of other suitable alternative interfaces are contemplated for the input power interface 16, the output power/control interface 18, the input control interface 24, and/or the output control interface 26 such as for example, releasable male or female interfaces of different connection types (e.g., registered jack (RJ) interfaces) or hardwired connections. It is also to be appreciated that the power cable 20, the power/communication cable 22, the communication cable 28, and the communication cable 30 can each have opposing connections that are compatible with the interfaces that they are connected with.

Figure 4:
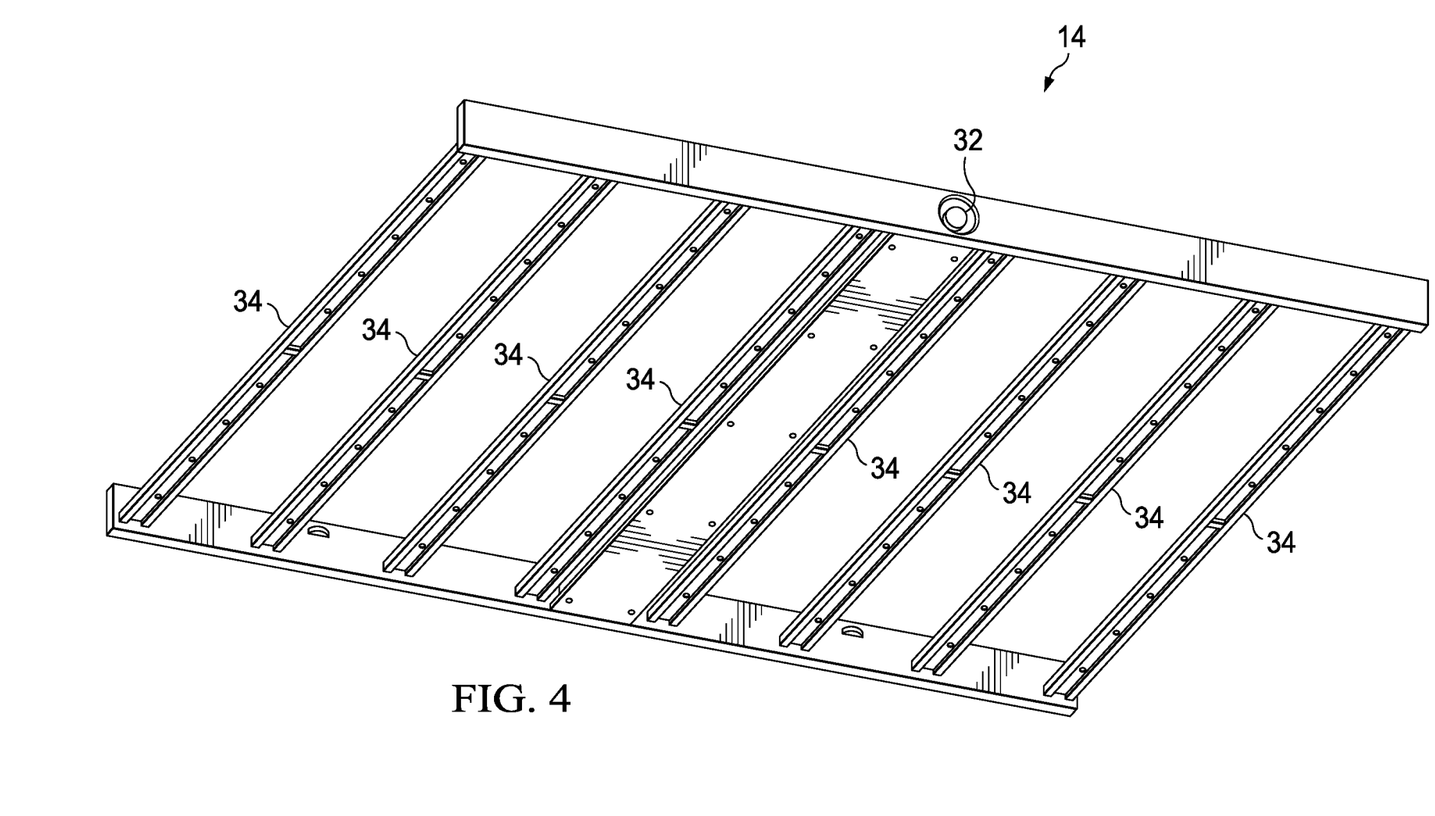
FIG. 4 is a front isometric view of the LED light fixture of FIG. 1.

As illustrated in FIG. 4, the LED light fixture 14 can include an input power/control interface 32 and a plurality of LED lights 34. The input power/control interface 32 can be coupled with the output power/control interface 18 of the adapter 12 via the power/communication cable 22. In one embodiment, the input power/control interface 32 can be a Wieland-type connector, although other connector types are contemplated. As will be described in further detail below, the power from the input power interface 16 and the LED-compatible driver signal generated by the adapter 12 can be transmitted/communicated to the LED light fixture 14 via the power/communication cable 22 to facilitate powering and controlling of the LED lights 34 in accordance with the original control signal from the automated greenhouse controller 11.

Figure 5:
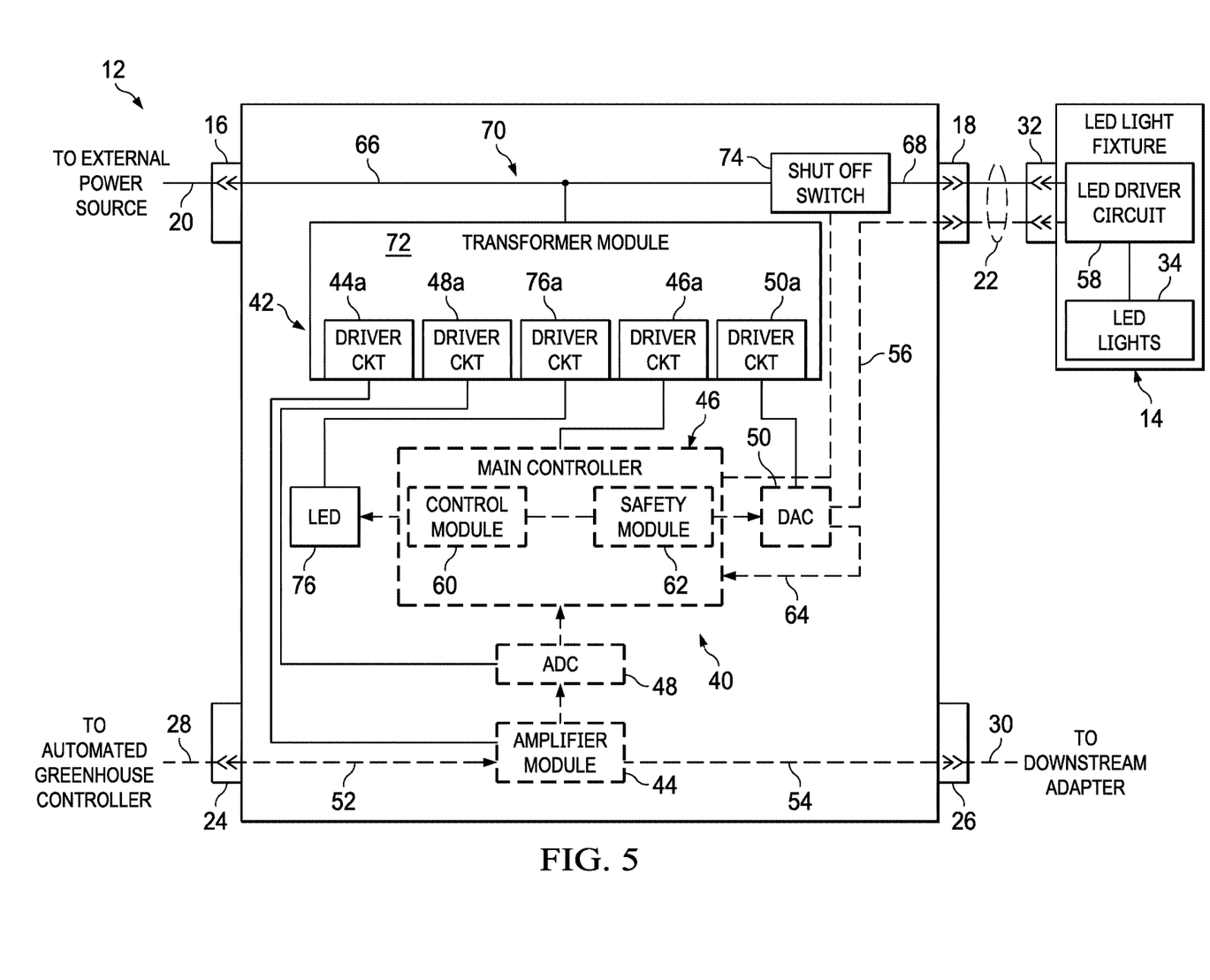
FIG. 5 is a schematic view of the adapter of FIG. 1.

Referring now to FIG. 5, a schematic view of the adapter 12 and the LED light fixture 14 is illustrated and will now be described. The adapter 12 can comprise a communication system 40 (shown in dashed lines) and a power system 42 (shown in solid lines). The communication system 40 can comprise an amplifier module 44, a main controller 46, an analog to digital converter (ADC) 48, and a digital to analog converter (DAC) 50. The amplifier module 44 can be in signal communication with the ADC 48. The main controller 46 can be in signal communication with the ADC 48 and the DAC 50.

The input control interface 24 can include a control input 52, and the output control interface 26 can include a control output 54. Each of the control input 52 and the control output 54 can be in signal communication with the amplifier module 44 such that the control input 52 and the control output 54 are in signal communication with each other via the amplifier module 44 to facilitate transmission of the original control signal from the control input 52 to the control output 54. The control input 52 can be in signal communication with the automated greenhouse controller 11 via the communication cable 28 to receive the original control signal from the automated greenhouse controller 11. The control output 54 can be in signal communication with a downstream adapter via the communication cable 30 to facilitate transmission of the original control signal from the amplifier module 44 to the downstream adapter.

Still referring to FIG. 5, the output power/control interface 18 can comprise a control output 56 that is in signal communication with the main controller 46 (via the DAC 50). The LED light fixture 14 can comprise an LED driver circuit 58 that is electrically coupled with the LED lights 34 and is configured to control the operation (e.g., dimming/intensity) of the LED lights 34. The LED driver circuit 58 can be in signal communication with the control output 56 via the power/communication cable 22.

When the original control signal from the automated greenhouse controller 11 is transmitted to the control input 52, the amplifier module 44 can amplify the original control signal to compensate for any degradation of the original control signal (e.g., due to transmission losses along the communication cable 28). The amplified version of the control signal can be communicated to the control output 54 and to a downstream adapter/communication device. Each downstream adapter can amplify the original control signal in a similar manner to preserve the integrity of the original control signal as it is transmitted along the network of adapters (e.g., as illustrated in dashed lines in FIG. 1). In one embodiment, the amplifier module 44 can include a plurality of mode chokes and an amplifier circuit (e.g., an operational amplifier) that are configured to facilitate amplification of the original control signal.

The amplifier module 44 can also route an amplified version of the original control signal to the main controller 46 via the ADC 48. The main controller 46 can then convert the amplified control signal into the LED-compatible driver signal, as will be described below, which is then routed to the control output 56 via the DAC 50 for transmission to the LED driver circuit 58 of the LED light fixture 14 to facilitate control of the LED lights 34. In one embodiment, each of the ADC 48 and the DAC 50 can comprise an amplifier-based circuit that facilitates analog-to-digital conversion and digital-to-analog conversion, respectively, of a signal. However, it is to be appreciated that any of a variety of analog-to-digital converters and digital-to-analog converters are contemplated.

The original control signal transmitted from the automated greenhouse controller 11 can be incompatible with the LED driver circuit 58 and thus incapable of directly controlling the light intensity emitted from the LED light fixture 14. The main controller 46 can accordingly be configured to convert (e.g., translate) the original control signal transmitted from the automated greenhouse controller 11 into an LED-compatible driver signal that is capable of driving the LED driver circuit 58 to control the light intensity emitted by the LED light fixture 14. The relationship between the original control signal transmitted by the automated greenhouse controller 11 and the LED-compatible driver signal transmitted to the LED driver circuit 58 can be a function of the respective signal protocols utilized by each of the automated greenhouse controller 11 and the LED driver circuit 58. For example, the automated greenhouse controller 11 might conform to a HID/xenon protocol that generates a 1-10 VDC control signal for varying the dimming of an associated HID/xenon light between 0% intensity and 100% intensity. The LED driver circuit 58, however, might conform to a different protocol that dims the LED lights 34 between 10% intensity and 100% intensity based upon an LED-compatible driver signal of between about 1-8 VDC. In such an example, the main controller 46 can be configured to generate a 1-8 VDC LED-compatible driver signal based upon the dimming intensity requested by the original control signal from the automated greenhouse controller 11.

It is to be appreciated that the main controller 46 can receive or generate a signal that conforms to any of a variety of suitable alternative signal protocols, such as BACnet, ModBus, or RS485, for example. The main controller 46 can be programmed with predefined parameters (e.g., in firmware) that govern the conversion of the original control signal into the LED-compatible driver signal. In one embodiment, the main controller 46 can be preprogrammed with the protocol specific parameters that are unique to the automated greenhouse controller 11 and the LED driver circuit 58. In another embodiment, the main controller 46 can be configured to detect the signal protocols of each of the automated greenhouse controller 11 and the LED driver circuit 58 and to generate an LED-compatible driver signal accordingly.

The main controller 46 is shown to include a control module 60 and a safety module 62. The control module 60 can be configured to facilitate the conversion of the original control signal from the automated greenhouse controller 11 into the LED-compatible driver signal. The safety module 62 can be configured to detect a failure condition of the adapter 12, such as leaky AC current in the LED light fixture 14, and shut down the adapter 12 in response to the failure condition. In one embodiment, each of the control module 60 and the safety module 62 can comprise an integrated circuit, such as a microcontroller unit.

The main controller 46 can also include a feedback circuit 64 that extends to the output of the DAC 50 and enables auto correction of the LED-compatible driver signal. The main controller 46 can monitor the LED-compatible driver signal via the feedback circuit 64 and can adjust the DC voltage of the LED-compatible driver signal to ensure that the proper dimming accuracy is being maintained (e.g., to compensate for any voltage losses across the DAC 50 and/or other voltage losses).

Still referring to FIG. 5, the input power interface 16 can include a power input 66 and the output power/control interface 18 can include a power output 68 that is electrically coupled with the power input 66 via a main bus 70. The power output 68 can be electrically coupled with the LED driver circuit 58 via the power/communication cable 22. The power input 66 can receive power from the power source 19 (FIG. 1) that is coupled with the input power interface 16 (e.g., via the power cable 20). The power can be routed along the main bus 70 and thus passed through to the power output 68 and to the LED light fixture 14 to facilitate powering of the LED light fixture 14. The control output 56 and the power output 68 can be enclosed within the output power/control interface 18 such that the power and control signal from the adapter 12 can be communicated to the LED light fixture 14 on the same cable (e.g., the power/communication cable 22).

In another embodiment, the adapter 12 and the LED light fixture 14 can each include separate interfaces for the control output 56 and the power output 68 such that the power and the LED-compatible driver signal are transmitted to the LED light fixture 14 along different cables.

The power system 42 can include a transformer module 72 that is configured to transform the power (e.g., AC power) from the main bus 70 into power (e.g., DC power) for powering the communication system 40. In one embodiment, the transformer module 72 can comprise a fly back circuit.

The transformer module 72 can be configured to generate different DC voltages (e.g., 5 VDC, 12 VDC, 15 VDC) for the communication system 40. In one embodiment, the transformer module 72 can comprise a plurality of driver circuits 44a, 46a, 48a, 50a that each generate a DC voltage for powering each of the amplifier module 44, the main controller 46, the ADC 48, and the DAC 50, respectively. For example, the driver circuit 44a can generate a 15 VDC voltage for the amplifier module 44, the driver circuit 46a can generate a 5 VDC voltage for the main controller 46, and the driver circuits 48a, 50a can generate a 12 VDC voltage for the ADC 48 and the DAC 50, respectively.

The power system 42 can also include a shut-off switch 74 that is electrically coupled with each of the power input 66 and the power output 68 and configured to selectively decouple the power input 66 from the power output 68 to interrupt the transmission of power to the LED light fixture 14 to turn the LED light fixture 14 off. The shut-off switch 74 can be coupled with the main controller 46 which can selectively operate the shut-off switch 74 in response to the original control signal. For example, in some instances, the LED driver circuit 58 might be incapable of dimming the LED lights 34 to 0% intensity (e.g., to turn the LED lights 34 off) when called to do so by the original control signal from the automated greenhouse controller 11. As such, when the original control signal from the automated greenhouse controller 11 is requesting 0% intensity, the main controller 46 can be configured to operate the shut-off switch 74 to turn the LED lights 34 off. The main controller 46 can also selectively operate the shut-off switch 74 to shut the adapter 12 off in response to the safety module 62 detecting an adapter failure condition.

The power system 42 can also include an LED indicator lamp 76 that is powered by a driver circuit 76a (e.g., at 5 VDC). The LED indicator lamp 76 can be selectively illuminated by the main controller 46 when the adapter 12 is turned on to provide visual indication to a user.

As described above, the adapter 12 can be installed in the lighting system 10, as illustrated in FIG. 1, when retrofitting the lighting system 10 with the LED light fixture 14. One example of the operation of the adapter 12 in the lighting system 10 will now be discussed. In this example, the automated greenhouse controller 11 can be configured to generate a 1-10 VDC control signal for (e.g., for HID/xenon lights) where a 1 VDC control signal correlates to 0% intensity (e.g., off) and a 10 VDC control signal correlates to 100% intensity (e.g., fully on). The LED driver circuit 58, however, can be configured to receive an LED-compatible driver signal of between 1-8 VDC where a 1 VDC LED-compatible driver signal correlates to 10% intensity and an 8 VDC LED-compatible driver signal correlates to 100% intensity (e.g., fully on).

When the automated greenhouse controller 11 transmits a control signal to the adapter 12 that requests dimming of the LED light fixture 14 to between about 10% intensity and about 100% intensity (e.g., the original control signal is between 1.9 VDC and 10 VDC), the main controller 46 can generate an appropriate LED-compatible driver signal of between 1 VDC and 8 VDC to control the dimming of the LED light fixture accordingly. During the transmission of the LED-compatible driver signal to the LED driver circuit 58, the main controller 46 can sense the voltage of the LED-compatible driver signal via the feedback circuit 64 and ensure that the voltage of the LED-compatible driver signal transmitted from the DAC 50 correlates properly with the dimming requested by the original control signal. If the automated greenhouse controller 11 transmits an control signal to the adapter 12 that requests full dimming of the LED light fixture 14 to 0% intensity, (e.g., the original control signal is between 0-1 VDC), the main controller 46 can recognize that the LED driver circuit 58 is not capable of dimming the LED lights 34 to 10% intensity (due to the configuration of the LED driver circuit 58 and the LED lights 34) and can instead operate the shut-off switch 74 to interrupt the AC power to the LED light fixture 14 thereby turning the LED lights 34 off. Throughout operation of the adapter 12, the safety module 62 can monitor the control module 60 for fault conditions. If a fault condition exists, such as if current leakage at the LED light fixture 14 damages the control module 60, the safety module 62 can facilitate operation of the shut-off switch 74 to interrupt the AC power to the LED light fixture 14 thereby turning the LED lights 34 off and preventing further damage to the adapter 12.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An adapter for a greenhouse and indoor grow automated controller, the adapter comprising;
   a power input configured to receive power from a power source;
   a power output electrically coupled with the power input and configured to transmit the received power to an LED light module;
   a control input configured to receive an original control signal from an automated greenhouse controller;
   a main controller coupled with the power input to facilitate powering of the main controller from the power source, the main controller being in signal communication with the control input and configured to convert the original control signal from the automated greenhouse controller into an LED-compatible driver signal;
   a first control output in signal communication with the main controller and configured to facilitate transmission of the LED-compatible driver signal to an LED light fixture, wherein the original control signal conforms to a first signal protocol and the LED-compatible driver signal conforms to a second signal protocol that is different from the first signal protocol;
   a second control output in signal communication with the control input and configured to transmit the original control signal to another adapter; and
   an amplifier module in signal communication with each of the control input and the second control output and configured to facilitate amplification of the original control signal.

2. The adapter of claim 1 wherein the amplifier module is in signal communication with the main controller.

3. The adapter of claim 2 wherein the main controller further comprises a safety module that is configured to detect a failure condition of the adapter and facilitate shutting down of the adapter in response to the failure condition.

4. The adapter of claim 2 further comprising a shut-off switch electrically coupled with the power input and the power output and in signal communication with the main controller, wherein the main controller is configured to selectively actuate the shut-off switch to facilitate interruption of power to the power output.

5. The adapter of claim 2 wherein the main controller further comprises a feedback circuit that facilitates correction of the LED-compatible driver signal.

6. The adapter of claim 1 further comprising a transformer module electrically coupled with the power input and the main controller, wherein:
   the power from the power source has a first voltage;
   the transformer module is configured to transform the first voltage of the power into a second voltage for powering of the main controller; and
   the second voltage is less than the first voltage.

7. The adapter of claim 6 wherein the transformer module comprises a fly back circuit.

8. The adapter of claim 1 wherein the main controller further comprises a safety module that is configured to detect a failure condition of the adapter and facilitate shutting down of the adapter in response to the failure condition.

9. The adapter of claim 1 further comprising a shut-off switch electrically coupled with the power input and the power output and in signal communication with the main controller, wherein the main controller is configured to selectively actuate the shut-off switch to facilitate interruption of power to the power output.

10. The adapter of claim 1 wherein the main controller further comprises a feedback circuit that facilitates correction of the LED-compatible driver signal.

11. The adapter of claim 1 further comprising:
    an input power interface associated with the power input;
    an input control interface associated with the control input; and
    an output power/control interface associated with the power output and the first control output.

12. A lighting system for an indoor grow facility, the lighting system comprising:
    an adapter comprising:
      a power input configured to receive power from a power source;
      a power output electrically coupled with the power input;
      a control input configured to receive an original control signal from an automated greenhouse controller;
      a main controller coupled with the power input to facilitate powering of the main controller from the power source, the main controller being in signal communication with the control input and configured to convert the original control signal from the automated greenhouse controller into an LED-compatible driver signal; and
      a first control output in signal communication with the main controller; and
    an LED light fixture comprising:
      an LED driver circuit in signal communication with the first control output and electrically coupled with the power output; and
      a plurality of LED lights electrically coupled with the LED driver circuit, wherein:
        the main controller transmits the LED-compatible driver signal to the LED light fixture to facilitate control of the plurality of LED lights;
        the original control signal conforms to a first signal protocol and the LED-compatible driver signal conforms to a second signal protocol that is different from the first signal protocol;
        the adapter comprises a second control output in signal communication with the control input and is configured to transmit the original control signal to another adapter; and
        the adapter further comprises an amplifier module in signal communication with each of the control input and the second control output and is configured to facilitate amplification of the original control signal.

13. The lighting system of claim 12 wherein the amplifier module is in signal communication with the main controller.

14. The lighting system of claim 13 wherein the main controller further comprises a safety module that is configured to detect a failure condition of the adapter and facilitate shutting down of the adapter in response to the failure condition.

15. The lighting system of claim 13 wherein the adapter further comprises a shut-off switch electrically coupled with the power input and the power output and in signal communication with the main controller, wherein the main controller is configured to selectively actuate the shut-off switch to facilitate interruption of power to the power output and the LED light fixture.

16. The lighting system of claim 13 wherein the main controller further comprises a feedback circuit that facilitates correction of the LED-compatible driver signal.

17. The lighting system of claim 12 wherein the adapter further comprises a transformer module electrically coupled with the power input and the main controller, wherein:
the power from the power source has a first voltage;
the transformer module is configured to transform the first voltage of the power into a second voltage for powering of the main controller; and
the second voltage is less than the first voltage.

18. The lighting system of claim 12 wherein the main controller further comprises a safety module that is configured to detect a failure condition of the adapter and facilitate shutting down of the adapter in response to the failure condition.

19. The lighting system of claim 12 wherein the adapter further comprises a shut-off switch electrically coupled with the power input and the power output and in signal communication with the main controller, wherein the main controller is configured to selectively actuate the shut-off switch to facilitate interruption of power to the power output and the LED light fixture.

20. The lighting system of claim 12 wherein the main controller further comprises a feedback circuit that facilitates correction of the LED-compatible driver signal.

21. An adapter for a greenhouse and indoor grow automated controller, the adapter comprising:
a power input configured to receive power from a power source;
a power output electrically coupled with the power input and configured to transmit the received power to an LED light module;
a control input configured to receive an original control signal from an automated greenhouse controller;
a main controller coupled with the power input to facilitate powering of the main controller from the power source, the main controller being in signal communication with the control input and configured to convert the original control signal from the automated greenhouse controller into an LED-compatible driver signal;
a first control output in signal communication with the main controller and configured to facilitate transmission of the LED-compatible driver signal to an LED light fixture;
a second control output in signal communication with the control input and configured to transmit the original control signal to another adapter;
an amplifier module in signal communication with each of the control input and the second control output and configured to facilitate amplification of the original control signal; and
a shut-off switch electrically coupled with the power input and the power output and in signal communication with the main controller, wherein the main controller is configured to selectively actuate the shut-off switch to electrically decouple the power input from the power output, wherein:
the main controller further comprises a feedback circuit that facilitates correction of the LED-compatible driver signal;
the main controller further comprises a safety module that is configured to detect a failure condition of the adapter and facilitate shutting down of the adapter in response to the failure condition; and
the original control signal conforms to a first signal protocol and the LED-compatible driver signal conforms to a second signal protocol that is different from the first signal protocol.

22. The adapter of claim 21 further comprising a transformer module electrically coupled with the power input and the main controller, wherein:
the power from the power source has a first voltage;
the transformer module is configured to transform the first voltage of the power into a second voltage for powering of the main controller; and
the second voltage is less than the first voltage.

* * * * *